United States Patent [19]
Whittaker et al.

[11] 3,780,208
[45] Dec. 18, 1973

[54] COMPOSITE HOSE HAVING A GROUNDING WIRE ENCLOSED IN A SLEEVE AND WRAPPED ABOUT THE CORE TUBE OF THE HOSE

[75] Inventors: Dewey E. Whittaker, Ravenna; Charles D. Jenks, Kent, both of Ohio

[73] Assignee: Samuel Moore & Company, Mantua, Ohio

[22] Filed: June 5, 1972

[21] Appl. No.: 259,661

[52] U.S. Cl. .................................................. 174/47
[51] Int. Cl. ............................................. F16l 11/12
[58] Field of Search ..................... 174/47; 138/103; 317/2 J; 340/320

[56] References Cited

UNITED STATES PATENTS

| 837,512 | 12/1906 | Seeley | 174/47 |
| 3,543,803 | 12/1970 | Chrow | 174/47 X |

*Primary Examiner*—Laramie E. Askin
*Attorney*—Richard K. Stevens et al.

[57] ABSTRACT

A composite hose adapted for conveying pressurized pulsating fluids is provided with a grounding wire secured to a protective sleeve helically wound about the core tube of the hose and adapted to slip as a unit relative to the core tube and surrounding fibrous reinforcing sheath as the hose expands radially in response to pulsating pressure.

12 Claims, 3 Drawing Figures

COMPOSITE HOSE HAVING A GROUNDING WIRE ENCLOSED IN A SLEEVE AND WRAPPED ABOUT THE CORE TUBE OF THE HOSE

This invention relates generally to composite tubing and more particularly to a hose for transmitting fluids under pressure in a spraying apparatus such as a paint spray.

Apparatus for spraying liquids such as paint is provided with a pump and hose assembly for transmitting liquid under pressure from a supply tank to a spray gun nozzle. An electrically conductive ground wire is usually included throughout the length of the hose to drain off any static electricity developed at the spray nozzle of the hose to prevent sparking when it approaches a conductor such as a steel beam. A hose having a flexible polymeric core tube, a fibrous reinforcing layer wound about the core tube and a protective sheath is used to convey the liquid at a pressure which is sufficiently high to produce a spray. The hose must be capable of expanding radially under the pulsation of the pump in order to act as an accumulator which attentuates the pulses so as to minimize pulsating at the nozzle and thereby produce a relatively smooth and uniform spray of liquid. On electric motor operated paint spray systems, the accumulator action also retards the rate of pressure change affecting the motor controlling pressure switch, thereby reducing the number of stops and starts of the motor controlling the fluid pump.

It has been proposed heretofore to wind a ground wire about the core tube as one of the braids of the reinforcing layer. However, the wire frequently broke under pressure and the abrasion of the braid by the wire sometimes resulted in bursting of the hose.

It is proposed in U.S. Pat. Nos. 3,445,583 and 3,543,803 to provide composite tubing for transmission of liquids from a pulsating source with a grounding wire helically wound about the core tube and enclosed within a rupture resistant sleeve. The composite tubing disclosed in U.S. Pat. No. 3,445,583 is provided with a grounding wire disposed between the core tube and braid. The grounding wire is secured to the core tube by a binder tape which covers the wire and is adhesively bound along opposed sides of the wire to the core tube. A protective tape may be disposed loosely over the binder tape. The hose disclosed in U.S. Pat. No. 3,543,803 is provided with a grounding wire enclosed in a sleeve formed from a supporting tape disposed between the wire and core tube, a binder tape which covers the wire and a protective tape over the binder tape. The binder tape is not adhesively secured to the wire. The supporting tape and protective tape are coextensive in width and their edges which extend beyond the edges of the binder tape are secured together to form an enclosing sleeve. The supporting tape is secured to the core tube. The conductive element is disposed in movable relation within the sleeve to accomodate expansion of the tube. While the disclosed hoses have been found to be adapted for successfully transmitting paints under most conditions, it has been found that in some applications and particularly at higher pressures of say 3,000 psi or more the ground wire sometimes ruptures and the fragments are not confined sufficiently to maintain continuity of the static discharge system.

It is therefore an object of this invention to provide an improved composite hose having a static discharge wire. Another object of the invention is to provide a composite hose for use with a paint spraying apparatus or the like which is adapted for transmission of fluids at pressures of 3,000 psi or higher and has a static discharge wire which is resistant to rupture even in hose which will withstand fluid pressures of 12,000 pounds per square inch or more. A further object of the invention is to provide a composite hose with a grounding wire coextensive with the length of the hose and helically wound about the core tube of the hose which is less likely to rupture upon radial expansion of the hose and which is protected against loss of electrical continuity if a rupture occurs.

Other objects will become apparent from the following description with reference to the accompanying drawing wherein.

The foregoing objects and others are accomplished in accordance with this invention, generally speaking, by providing a composite hose having a synthetic resinous core tube, a fibrous reinforcing layer about the core tube, a protective sheath about the fibrous layer and a grounding wire enclosed in a sleeve disposed between the core tube and fibrous layer and helically wound about the core tube. The sleeve is formed about substantially the entire length of wire by placing a pair of plastic tapes in face-to-face relationship on opposite sides of the wire and adhesively or otherwise binding the edges of the tapes together along each side of the wire. Preferably, that surface of each tape which faces the wire carries an adhesive so that both tapes are adhesively bound to the wire as well as to each other along each side of the wire. The tape which is disposed between the wire and the core tube should be at least as wide as the tape disposed over the opposite side of the wire if the latter carries an adhesive to avoid sticking of the sleeve to the core tube. The invention thus provides a composite hose having a grounding wire enclosed in a sleeve which is not adhesively bound to either the core tube or reinforcing layer and has an external surface which will slip over the surface of the core tube or over the surface of the reinforcing layer.

It has been found that a grounding wire secured against relative movement within an enclosing sleeve so that the wire and sleeve slip as a unit in response to radial expansion of the hose is less likely to rupture when the hose expands than is a wire bound to the core tube. Moreover, by binding the wire to the sleeve and preventing relative movement between the wire and the surrounding walls of the sleeve, fragments of wire produced if there is a rupture are confined closely together in the area where the rupture occurs thereby maintaining continuity of the electrical circuit.

Figure 1:
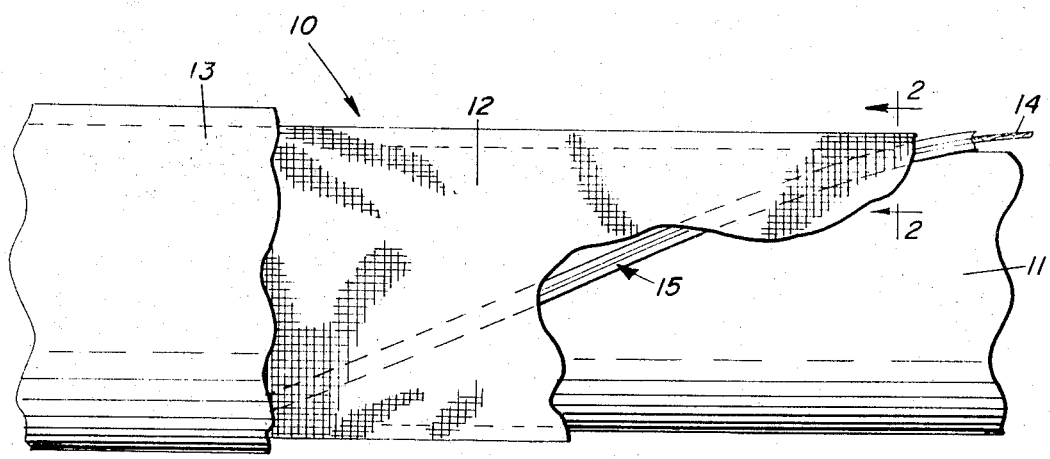
FIG. 1 is an elevation, partially cut-away and partially in section, of one embodiment of the invention.

Referring now to FIG. 1 of the drawing, a composite hose 10 has a nylon core tube 11, a fibrous nylon braid reinforcing layer 12 helically wound about tube 11 and a polyurethane sheath 13 about the braid 12. Interposed between tube 11 and braid 12 and helically wound about tube 11 is a grounding wire 14 enclosed in a sleeve 15. Sleeve 15 may be formed by placing wire 14 between two Mylar tapes 16 and 17 each having an adhesive coated surface facing the wire and then helically winding the resulting sleeve 15 about core tube 11. Alternately, sleeve 15 may be formed about wire 14 by helically winding a Mylar tape 16 about the core tube 11 with an adhesive surface on the tape 16 exposed. The surface of tape 16 facing tube 11 is free from adhesive. A flat braided copper wire 14 may then be helically wound over the tape 16. A second Mylar tape 17 may then be helically wound over wire 14 with its adhesive coated surface facing the wire 14. Tape 17 should not be any wider than tape 16 in order to insure that it does not become adhesively bound to the core. During the winding operations, the wire 14 becomes secured between tapes 16 and 17 which are pressed together along each side of wire 14 to seal their edges together. A braid 12 and sheath 13 may then be placed over the core tube and grounding wire by conventional means.

Figure 2:
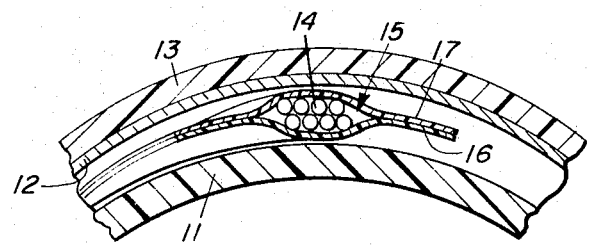
FIG. 2 is an enlarged cross-section taken along the line 2—2 of FIG. 1.

A composite hose with a grounding wire 14 is shown in an exaggerated cross-section in FIG. 2 to illustrate that the sleeve 15 is not attached to either the braid 12 or core tube 11 and is free to slip to relieve concentrated stresses in a given area. The grouding wire 14 and sleeve 15 may move relative to tube 11 and braid 12 in response to expansion of the hose due to pulsating pressure.

The core tube 11 may be formed from any material suitable for transmission of fluids under pressure such as polyurethane, polyethylene or nylon.

The reinforcing braid may be any suitable material such as Dacron, the polyester fiber sold by Dupont, nylon or the like. The reinforcing material may be wound about the core in one or more layers and preferably one to four layers. The sheath may be extruded nylon, polyurethane, polyvinyl chloride, polyethylene or other suitable abrasion and solvent resistant covering material.

The two tapes used to make sleeve 15 may be the same or different. Although Mylar tapes are preferred, other flexible films such as polyethylene, polyvinyl chloride or the like may be used. Mylar is a poly(ethylene) terephthalate polyester sold by Dupont. The adhesive on the tape may be any suitable one such as a pressure sensitive resin based adhesive.

Figure 3:
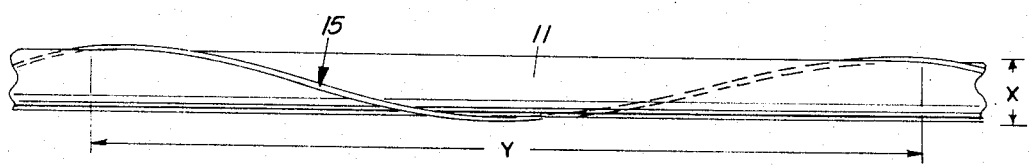
FIG. 3 is an elevation of a length of core tubing having a protected ground wire helically wound thereabout as it appears prior to the winding of the fibrous reinforcing layer about the core tube.

The grounding wire is usually a plurality of wires braided or twisted together to form a flexible, thin conductor. The pitch distance of the helically wound wire may vary with the diameter of the core tube insolong as it is so disposed that it will not materially reduce the flexibility of the composite hose. However, it is preferred that the pitch distance Y be relatively great as indicated in FIG. 3 of the drawing. For example, a distance Y between corresponding axially spaced points on the convolutions of about 4 to 16 times the diameter X is advantageous.

As the hose provided by the invention expands radially in response to pulsating of the liquid being pumped therethrough, the grounding wire 14 and sleeve 15 must respond by also moving radially outwardly. Since slippage between the smooth surfaces of the sleeve and the core tube on one side and between the smooth surface of the sleeve and the fibrous layer on the other side will permit minor adjustments of the position of the envelope, thereby reducing stress concentrations as the hose bulges, there is a decreased tendency for the filaments of the wire to become embrittled and break from bending back and forth. Furthermore, since an adhesive layer faces the wire on each side, any fragments of wire produced when the wire ultimately ruptures can move very little so they remain sufficiently close together to maintain electrical continuity of the grounding wire.

The grounding wire and its surrounding sleeve may be used to advantage in hoses designed for use at any internal pressure but it is particularly advantageous in hoses having a minimum burst strength of 12,000 psi or more.

The following sample hoses were made and tested to illustrate the increased resistance of the hose provided by this invention to loss of continuity of the grounding wire:

Sample A. A composite hose having a core tube, braid reinforcement and protective sheath and a helically wound grounding wire secured to the core with a binder tape covered by a protective tape.

Sample B. A composite hose having a core tube, braid reinforcement and protective sheath and a grounding wire helically wound about the core tube. A supporting tape was disposed between the wire and core tube and was adhesively secured to the core tube. A binder tape of less width than the supporting tape enclosed the wire but was not secured to it. An outer protective tape coextensive in width with the support tape was disposed over the binder tape and secured along its edges throughout its length to the supporting tape.

Sample C. A composite hose made in accordance with this invention had a core tube, braid reinforcement and protective sheath and a grounding wire adhesively secured inside a protective Mylar sleeve helically wound about the core tube. The sleeve was not secured to either the reinforcing braid or the core tube.

Samples A, B and C were essentially the same except for the means used to protect the grounding wire. The core tubes were nylon. The tapes of A and B were Mylar and polyvinyl chloride. The tape of Sample C was Mylar only. The braid was nylon. The sheaths were polyurethane. Eight hoses of each sample were tested by introducing fluid into the core under an impulse pressure of 4,500 psi. This was continued for about 50 hours with each hose expanding radially and contracting over 100,000 times. An electric current was passed through the grounding wire of each hose while it was flexing. It was found that after only 1.6 hours flexing, three of the eight Sample A hoses were conducting electricity only intermittently. All eight of the Sample B hoses conducted electricity only intermittently after 0.3 hour while all eight of the Sample C hoses conducted the electrical current continuously after flexing over the entire test period.

Although the invention has been described in detail for the purpose of illustration, it is to be understood that such detail is solely for that purpose and that variations can be made by those skilled in the art without departing from the spirit and scope of the invention except as it may be limited by the claims.

The embodiments of the invention in which an exclusive property or privilege is claimed are defined as follows:

1. A composite hose adapted for conveying pressurized pulsating fluids comprising a core tube, a fibrous reinforcing material about the core tube and a grounding wire enclosed in a sleeve helically wound about the core tube and disposed between the core tube and fibrous material, said wire and sleeve being substantially coextensive in length with the core tube, said sleeve having an external surface adjacent the core tube and adjacent the fibrous material which is slidable thereover and an internal adhesive surface bound to the wire, whereby the said wire and its enclosing sleeve may slip as a unit relative to the fibrous material and to the core in response to radial expansion of the hose.

2. The composite hose of claim 1 having a protective sheath about the fibrous material.

3. The composite hose of claim 2 wherein the core tube is nylon, the fibrous material is nylon, the sheath is polyurethane and the tapes are poly(ethylene) terephthalate polyester.

4. The composite hose of claim 2 wherein the core tube is nylon, the fibrous material is nylon, the sheath is nylon and the tapes are poly(ethylene) terephthalate polyester.

5. The composite hose of claim 2 wherein the core tube is nylon, the fibrous material is a polyester, the sheath is polyurethane and the tapes are poly(ethylene) terephthalate polyester.

6. The composite hose of claim 2 wherein the core tube is nylon, the fibrous material is polyester, the sheath is nylon and the tapes are poly(ethylene) terephthalate polyester.

7. The composite hose of claim 1 wherein the distance between axially spaced points on adjacent convolutions of said wire is greater than the maximum transverse dimension of the core tube.

8. The composite hose of claim 7 wherein the said distance is from about 4 to about 16 times the diameter of the hose.

9. The composite hose of claim 1 wherein the wire is a flat braid of copper wires.

10. The composite hose of claim 1 wherein the sleeve is composed essentially of two tapes, one disposed between the wire and core tube and the other disposed between the wire and fibrous material, said tapes having their facing surfaces adhesively bound to the wire and together along each side of the wire.

11. The composite hose of claim 6 wherein the tapes are a polyester.

12. The composite hose of claim 1 having one to four layers of fibrous material.

\* \* \* \* \*